US008960935B2

(12) United States Patent
Jang et al.

(10) Patent No.: US 8,960,935 B2
(45) Date of Patent: Feb. 24, 2015

(54) BACKLIGHT UNIT AND LIQUID CRYSTAL DISPLAY DEVICE HAVING THE SAME

(75) Inventors: Eun Seok Jang, Paju-si (KR); Sung Keun Lee, Goyang-si (KR); Jae Ho Lee, Sincheon (KR); Chang Ho Lee, Gumi-si (KR); Yong Kon Lee, Seoul (KR); Oh Sang Kwon, Incheon (KR); Dae Heung Lee, Paju-si (KR); Seung Hyun Kim, Seoul (KR); Jin Seo Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 939 days.

(21) Appl. No.: 11/964,432

(22) Filed: Dec. 26, 2007

(65) Prior Publication Data
US 2008/0180947 A1 Jul. 31, 2008

(30) Foreign Application Priority Data

Jan. 31, 2007 (KR) .................. 10-2007-0009922
Feb. 15, 2007 (KR) .................. 10-2007-0015970

(51) Int. Cl.
G09F 13/04 (2006.01)
G02F 1/1335 (2006.01)
(52) U.S. Cl.
CPC ................. *G02F 1/133604* (2013.01)
USPC ......... 362/97.1; 362/97.2; 362/221; 362/222; 345/47; 345/102
(58) Field of Classification Search
USPC ........ 362/97.1, 97.2, 561, 631, 97.3, 85, 221, 362/222; 345/102, 47
See application file for complete search history.

(56) References Cited

U.S. PATENT DOCUMENTS

| 4,994,944 | A * | 2/1991 | Vernondier | 362/239 |
| 6,309,081 | B1 * | 10/2001 | Furihata | 362/634 |
| 7,172,330 | B2 * | 2/2007 | Lee et al. | 362/634 |
| 7,182,637 | B2 * | 2/2007 | Coyle et al. | 439/557 |
| 7,267,472 | B2 * | 9/2007 | Shiau et al. | 362/633 |
| 7,434,957 | B2 * | 10/2008 | Kim et al. | 362/225 |
| 7,524,210 | B2 * | 4/2009 | Lee et al. | 439/620.02 |
| 2005/0099790 | A1 * | 5/2005 | Kang et al. | 362/31 |

(Continued)

FOREIGN PATENT DOCUMENTS

| CN | 1459889 A | 12/2003 |
| CN | 1484074 A | 3/2004 |

(Continued)

OTHER PUBLICATIONS

Office Action issued in corresponding Chinese Patent Application No. 2007103021550; Jul. 10, 2009.

(Continued)

*Primary Examiner* — Mary McManmon
(74) *Attorney, Agent, or Firm* — Brinks Gilson & Lione

(57) ABSTRACT

Disclosed is a printed circuit board, on which a holder for fixing a lamp is mounted, is disposed on an upper surface of a bottom cover, and an inverter supplying a driving voltage to the lamp is disposed on a lower surface of the bottom cover. The printed circuit board is electrically connected to the holder as a conductive pattern is embedded in the printed circuit board. The connector is directly mounted on the inverter, or it is connected to the inverter via a wire. In this case, the connector is also connected to the printed circuit board. Therefore, the connector of the inverter and the connector of the printed circuit board are electrically connected.

9 Claims, 12 Drawing Sheets

(56) References Cited

U.S. PATENT DOCUMENTS

| | | | |
|---|---|---|---|
| 2005/0265047 A1* | 12/2005 | Yun et al. | 362/611 |
| 2006/0006405 A1* | 1/2006 | Mazzochette | 257/99 |
| 2006/0203174 A1* | 9/2006 | Ha et al. | 349/149 |
| 2006/0286831 A1* | 12/2006 | Kwon et al. | 439/108 |
| 2007/0001626 A1* | 1/2007 | Park | 315/312 |

FOREIGN PATENT DOCUMENTS

| | | |
|---|---|---|
| CN | 1811565 A | 8/2006 |
| CN | 1892358 A | 1/2007 |
| KR | 1020030054763 A | 7/2003 |
| KR | 1020060128140 A | 12/2006 |
| WO | WO 2007007621 A1 * | 1/2007 |

OTHER PUBLICATIONS

Fourth Office Action issued in corresponding Chinese Patent Application No. 2007103021550, mailed Sep. 16, 2010.

Office Action issued in corresponding Korean Patent Application No. 10-2007-0015970, mailed Sep. 24, 2012.

* cited by examiner

BACKLIGHT UNIT AND LIQUID CRYSTAL DISPLAY DEVICE HAVING THE SAME

CROSS-REFERENCE TO RELATED APPLICATIONS

The present application claims priority under 35 U.S.C. 119 and 35 U.S.C. 365 to Korean Patent Application Nos. 015970/2007, filed on Feb. 15, 2007, and 009922/2007, filed on Jan. 31, 2007, which are hereby incorporated by reference in their entirety.

BACKGROUND OF THE INVENTION

1. Field of the Invention

The present invention relates to a backlight unit, and more particularly, to a backlight unit having an efficient assembly structure and a liquid crystal display device having the same

2. Description of the Related Art

A liquid crystal display device displays an image using light. The liquid crystal display device does not emit light by itself, and therefore it necessarily requires a backlight unit for generating light.

The backlight unit is classified into an edge type backlight unit or a direct type backlight unit depending on the location of a light source.

FIG. 11 is an exploded perspective view schematically showing a direct type liquid crystal display device in the related art.

Referring to FIG. 11, the related art liquid crystal display device includes a backlight unit 10, a panel guide 60, a liquid crystal panel 70 and a case 80.

The backlight unit 10 includes a bottom cover 11, a reflective sheet 13, first and second lower side frames 15 and 16, first and second common electrodes 18 and 19 each having a plurality of holders, a plurality of lamps 21, first and second upper side frames 23 and 25, an optical sheet 26, first and second inverters 28 and 29, and first and second protective covers 31 and 32.

The reflective sheet 13, the first and second lower side frames 15 and 16, the first and second common electrodes 18 and 19 and the first and second upper side frames 23 and 24 is sequentially seated on the bottom cover 11. Each common electrode 18 and 19 is fixed to the first and second lower side frames 15 and 16. The first and second lower side frames 15 and 16 are fixed to the bottom cover 11 through the reflective sheet 13. The first and second upper side frames 23 and 24 are fixed to the first and second lower side frames 15 and 16, respectively.

As shown in FIG. 12, the plurality of holders 18a and 19a is integrally formed on each of the first and second common electrodes 18 and 19. The lamps 21 are electrically connected to the holders 18a and 19a of the first and second common electrodes 18 and 19.

Wires 28a and 29a of the first and second inverters 28 and 29 are electrically connected to the first and second common electrodes 18 and 19 by using screw, respectively.

The optical sheet 26 is seated on the first and second upper side frames 23 and 24. The panel guide is disposed on the first and second upper side frames. The liquid crystal panel 70 is seated on the panel guide 60. The case 80 is fixed to the bottom cover 11.

The direct type backlight unit is widely used for a medium/large sized liquid crystal display device for displaying a large sized image, since light which is emitted from the respective lamp 21 is directly irradiated to a front.

The related art direct type liquid crystal display device has disadvantages in that the assembly process is complicated because the first and second lower side frames 15 and 16, the first and second common electrodes 18 and 19, and the first and second upper side frames 23 and 24 should be fastened, respectively.

In addition, the related art direct type liquid crystal display device has disadvantages in that a noise of a vibration due to a high driving voltage is generated from the first and second common electrodes 18 and 19 since the first and second common electrodes 18 and 19 are fixed to the first and second lower side frames 15 and 16 by using screw.

SUMMARY

According to a first embodiment, a backlight unit includes a bottom cover; a first printed circuit board provided in a first upper surface of the bottom cover and having a first conductive pattern; a second printed circuit board provided in a second upper surface of the bottom cover and having a second conductive pattern; a first inverter provided in a first lower surface of the bottom cover; a first wire connected to the first inverter; a second inverter provided in a second lower surface of the bottom cover; a second wire connected to the second inverter; a plurality of first holders mounted on the first printed circuit board and electrically connected to the first conductive pattern; a plurality of second holders mounted on the second printed circuit board and electrically connected to the second conductive pattern; and a plurality of lamps of which both ends are fixed in the respective first holders and the respective second holders, wherein the first wire is electrically connected to the first printed circuit board, and the second wire is electrically connected to the second printed circuit board.

According to a second embodiment, a backlight unit includes a bottom cover; a first printed circuit board provided in a first upper surface of the bottom cover and having a first conductive pattern; a first connector provided in a first lower surface of the first printed circuit board and connected to the first conductive pattern; a second printed circuit board provided in a second upper surface of the bottom cover and having a second conductive pattern; a second connector provided in a second lower surface of the second printed circuit board and connected to the second conductive pattern; a first inverter provided in a first lower surface of the bottom cover; a first wire connected to the first inverter; a third connector connected to the first wire and the first connector; a second inverter provided in a second lower surface of the bottom cover; a second wire connected to the second inverter; a fourth connector connected to the second wire and the second connector; a plurality of first holders mounted on the first printed circuit board and electrically connected to the first conductive pattern; a plurality of second holders mounted on the second printed circuit board and electrically connected to the second conductive pattern; and a plurality of lamps of which both ends are fixed in the respective first holders and the respective second holders, wherein the third connector is electrically connected to the first connector, and the fourth connector is electrically connected to the second connector.

According to a third embodiment, a backlight unit includes a bottom cover; a first printed circuit board provided in a first upper surface of the bottom cover and having a first conductive pattern; a first connector provided in a first lower surface of the first printed circuit board and connected to the first conductive pattern; a second printed circuit board provided in a second upper surface of the bottom cover and having a second conductive pattern; a second connector provided in a second lower surface of the second printed circuit board and connected to the second conductive pattern; a first inverter provided in a first lower surface of the bottom cover; a third connector provided in a first upper surface of the first inverter and connected to the first inverter; a second inverter provided in a second lower surface of the bottom cover; a fourth connector provided in a second upper surface of the second inverter and connected to the second inverter; a plurality of first holders mounted on the first printed circuit board and electrically connected to the first conductive pattern; a plurality of second holders mounted on the second printed circuit board and electrically connected to the second conductive pattern; and a plurality of lamps of which both ends are fixed in the respective first holders and the respective second holders, wherein the third connector is electrically connected to the first connector, and the fourth connector is electrically connected to the second connector.

According to a fourth embodiment, a liquid crystal display device includes a backlight unit composed of a bottom cover, a first printed circuit board provided in a first upper surface of the bottom cover and having a first conductive pattern, a second printed circuit board provided in a second upper surface of the bottom cover and having a second conductive pattern, a first inverter provided in a first lower surface of the bottom cover, a first wire connected to the first inverter, a second inverter provided in a second lower surface of the bottom cover, a second wire connected to the second inverter, a plurality of first holders mounted on the first printed circuit board and electrically connected to the first conductive pattern, a plurality of second holders mounted on the second printed circuit board and electrically connected to the second conductive pattern, and a plurality of lamps of which both ends are fixed in the respective first holders and the respective second holders; and a liquid crystal panel provided on the backlight unit and displaying images using light emitted from the backlight unit, wherein the first wire is electrically connected to the first printed circuit board, and the second wire is electrically connected to the second printed circuit board.

According to a fifth embodiment, a liquid crystal display device includes a backlight unit composed of a bottom cover, a first printed circuit board provided in a first upper surface of the bottom cover and having a first conductive pattern, a first connector provided in a first lower surface of the first printed circuit board and connected to the first conductive pattern, a second printed circuit board provided in a second upper surface of the bottom cover and having a second conductive pattern, a second connector provided in a second lower surface of the second printed circuit board and connected to the second conductive pattern, a first inverter provided in a first lower surface of the bottom cover, a first wire connected to the first inverter, a third connector connected to the first wire and the first connector, a second inverter provided in a second lower surface of the bottom cover, a second wire connected to the second inverter, a fourth connector connected to the second wire and the second connector, a plurality of first holders mounted on the first printed circuit board and electrically connected to the first conductive pattern, a plurality of second holders mounted on the second printed circuit board and electrically connected to the second conductive pattern, and a plurality of lamps of which both ends are fixed in the respective first holders and the respective second holders; and a liquid crystal panel provided on the backlight unit and displaying images using light emitted from the backlight unit, wherein the third connector is electrically connected to the first connector, and the fourth connector is electrically connected to the second connector.

According to a sixth embodiment, a liquid crystal display device includes a backlight unit composed of a bottom cover, a first printed circuit board provided in a first upper surface of the bottom cover and having a first conductive pattern, a first connector provided in a first lower surface of the first printed circuit board and connected to the first conductive pattern, a second printed circuit board provided in a second upper surface of the bottom cover and having a second conductive pattern, a second connector provided in a second lower surface of the second printed circuit board and connected to the second conductive pattern, a first inverter provided in a first lower surface of the bottom cover, a third connector provided in a first upper surface of the first inverter and connected to the first inverter, a second inverter provided in a second lower surface of the bottom cover, a fourth connector provided in a second upper surface of the second inverter and connected to the second inverter, a plurality of first holders mounted on the first printed circuit board and electrically connected to the first conductive pattern, a plurality of second holders mounted on the second printed circuit board and electrically connected to the second conductive pattern, and a plurality of lamps of which both ends are fixed in the respective first holders and the respective second holders; and a liquid crystal panel provided on the backlight unit and displaying images using light emitted from the backlight unit, wherein the third connector is electrically connected to the first connector, and the fourth connector is electrically connected to the second connector.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention together with the description and serve to explain the principle of the invention.

DETAILED DESCRIPTION OF THE INVENTION

Hereinafter, the present invention will be explained in detail by explaining exemplary embodiments with reference to the accompanying drawings.

Figure 1:
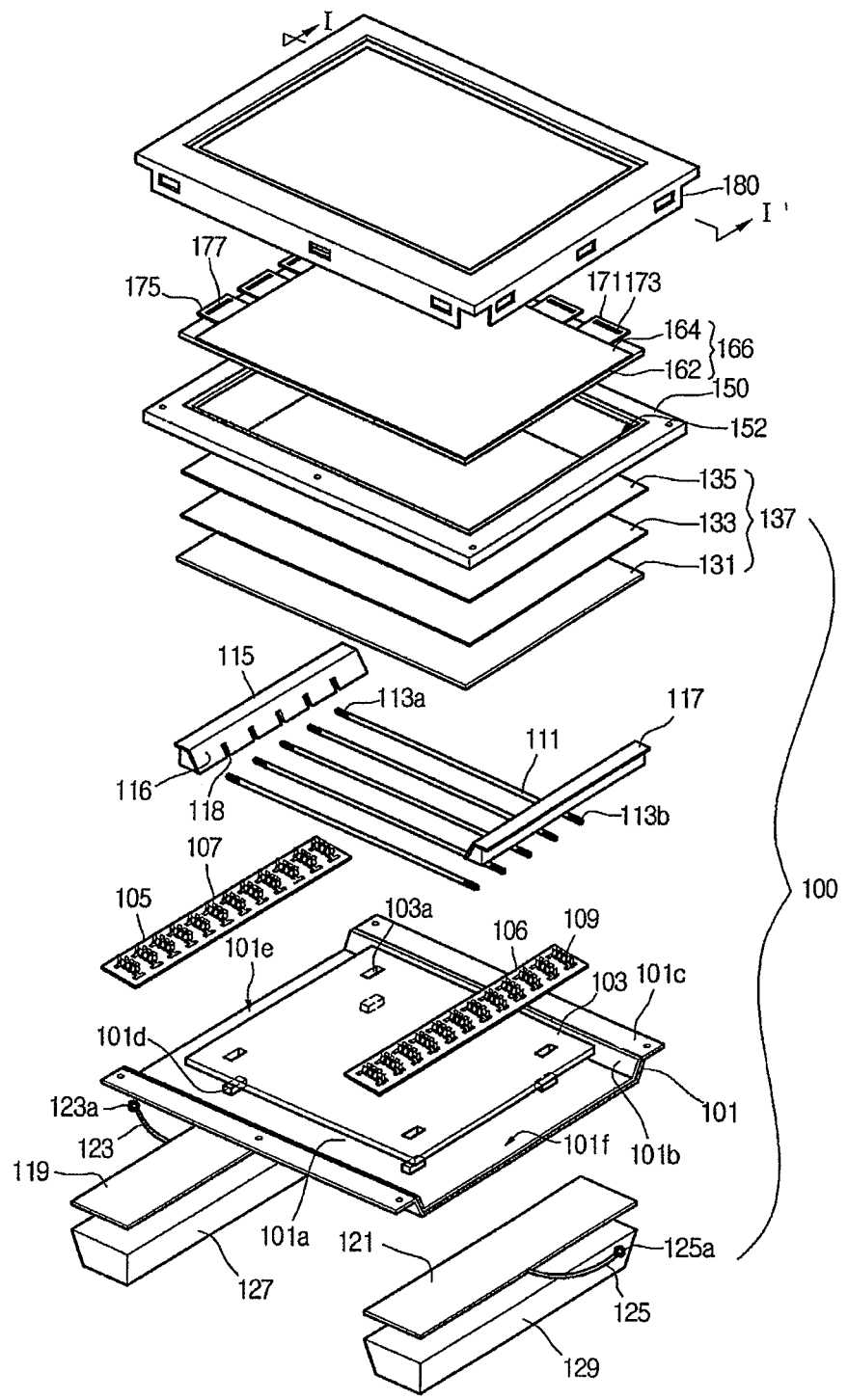
FIG. 1 is an exploded perspective view schematically showing a liquid crystal display device according to a first embodiment of the present disclosure.
Figure 2:
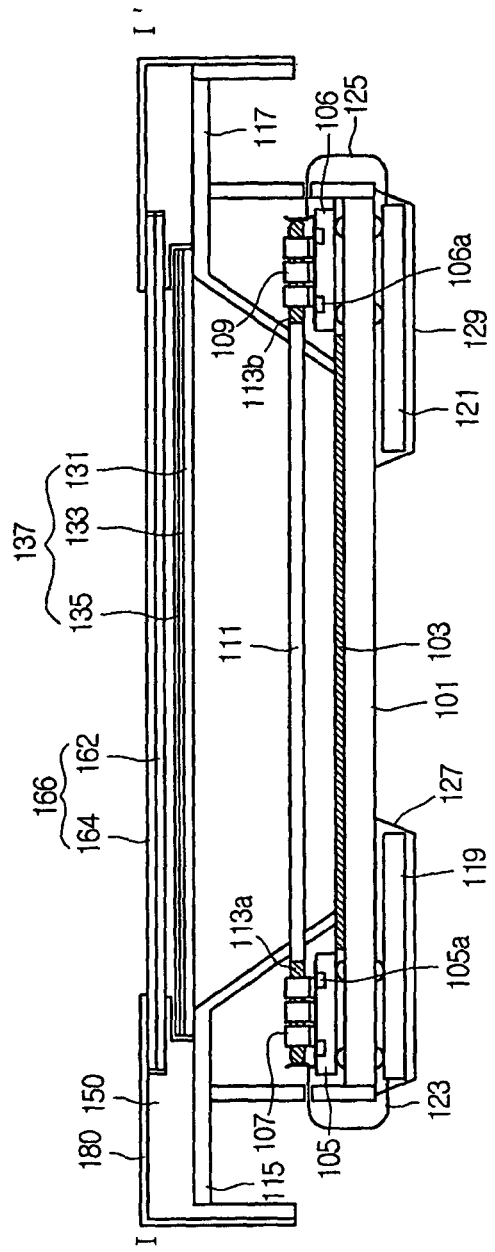
FIG. 2 is a cross-sectional view taken along the line I-I' of the liquid crystal display device shown in FIG. 1.

FIG. 1 schematically shows a liquid crystal display device according to a first embodiment of the present disclosure in an exploded perspective view, and FIG. 2 shows the liquid crystal display device shown in FIG. 1, which is taken along the line I-I', in a cross-sectional view.

Referring to FIGS. 1 and 2, the liquid crystal display device includes a backlight unit 100, a panel guide 150, a liquid crystal panel 166 and a case 180.

The liquid crystal panel 166 is seated on a panel support 152 of the panel guide 150 and controls transmittance of light from the backlight unit 100 to display an image. The liquid crystal panel 166 includes a lower substrate 162, an upper substrate 164, a liquid crystal layer (not shown) interposed between the lower substrate 162 and the upper substrate 164, and a spacer (not shown) maintaining a distance between the lower substrate 162 and the upper substrate 164.

The upper substrate 164 includes a color filter layer including red, green, and blue color filters. The upper substrate 164 further may include a common electrode depending on a liquid crystal mode.

The lower substrate 162 is arranged such that gate lines intersect with data lines. A pixel region is defined by the gate and data lines. Therefore, the pixel region is arranged in a matrix form. A display region is defined by the plurality of pixel regions, and a non-display region is defined by regions outside the display region. On the pixel region, a thin film transistor electrically connected to the gate and data lines and a pixel electrode electrically connected to the thin film transistor are formed.

The thin film transistor applies a video signal supplied from the data lines to the pixel electrode in response to a gate signal supplied from the gate lines. The common electrode may be formed on the lower substrate 162 depending on the mode of the liquid crystal.

On the non-display region of the lower substrate 162, a data pad region in which a data pad (not shown) electrically connected to the data line is formed and a gate pad region in which a gate pad (not shown) electrically connected to the gate line is formed are disposed.

A plurality of data circuit films 171, on which a data integrated circuit 173 for supplying the video signal to the data line is mounted, are attached to the data pad region. A tape carrier package or a chip on film may be used as each of the data circuit films 171. Each of the data circuit films 171 supplies the data signal from a data printed circuit board (not shown) to the data integrated circuit 173, and it supplies the video signal outputted from the data integrated circuit 173 to the data line. On the contrary, the data integrated circuit 173 may be directly mounted on the lower substrate 162 by using a chip on glass process.

A plurality of gate circuit films 175, on which a gate integrated circuit 177 for supplying the gate signal to the gate line is mounted, are attached to the gate pad region. A tape carrier package or a chip on film may be used as each of the gate circuit films 175. Each of the gate circuit films 175 applies a gate control signal supplied from a gate printed circuit board through the gate circuit films 175 and the lower substrate 162 to the gate integrated circuit 177, and it supplies the gate signal outputted from the gate integrated circuit 177 to the gate line. On the contrary, the gate integrated circuit 177 may be directly mounted on the lower substrate 162 by using a chip on glass process, or it may be formed on the lower substrate 162 with the manufacturing process of the thin film transistor.

The panel guide 150 is mounted on a seating surface 101c of the bottom cover 101 so that it surrounds a side of the bottom cover 101 as well as an edge and a side of an optical sheet 137. The panel guide 150 is provided with a panel support 152 supporting the liquid crystal panel 166.

The case 180 is bent such that it surrounds a front non-display region of the liquid crystal panel 166 and a side of the bottom cover 101. The case 180 is fixed as it is fastened to the panel guide 150 surrounding a side of the bottom cover 101.

The backlight unit 100 includes a bottom cover 101, a reflective sheet 103, first and second printed circuit boards 105 and 106, a plurality of first and second holders 107 and 109, a plurality of lamps 111, first and second side frames 115 and 117, an optical sheet 137, first and second inverters 119 and 121, and first and second protective covers 127 and 129.

The bottom cover 101 includes a bottom surface 101a, a slanted surface 101b which is extended from the bottom surface 101a and inclined at a specific angle, and a seating surface 101c which is extended from the slanted surface 101b. The slanted surface 101b is formed in both sides of the bottom surface 101a. The seating surface 101c has a predetermined height from the bottom surface 101a, and it is formed in both sides of the slanted surface 101b. The respective slanted surface 101b is formed to face each other.

In the bottom surface 101a of the bottom cover 101, projection regions 101d which are upwardly protruded in 4 regions are formed. The reflective sheet 103 is inserted in the respective projection regions 101d, thereby preventing the flow of the reflective sheet 103.

The reflective sheet 103 reflects light, and four insertion holes 103a are formed in the regions corresponding to the projection regions 101d of the bottom cover 101. Therefore, the insertion holes 103a of the reflective sheet 103 are inserted into the projection regions 101d formed in the bottom surface 101a of the bottom cover 101, and thus, the flow of the reflective sheet 103 can be prevented.

In the preferred embodiments of the present invention, the reflective sheet 103 is explained as an example, however it is possible to directly coat a reflective substance to the bottom cover 101.

The first printed circuit board 105 is fastened to a first region 101e of the bottom cover 101, and the second printed circuit board 106 is fastened to a second region 101f of the bottom cover 101. The first and second regions 101e and 101f is positioned in the bottom surface 101a in which the seating surface 101c is not disposed. The first and second regions 101e and 101f may be positioned in both edge regions of the bottom surface 101a.

Figure 3:
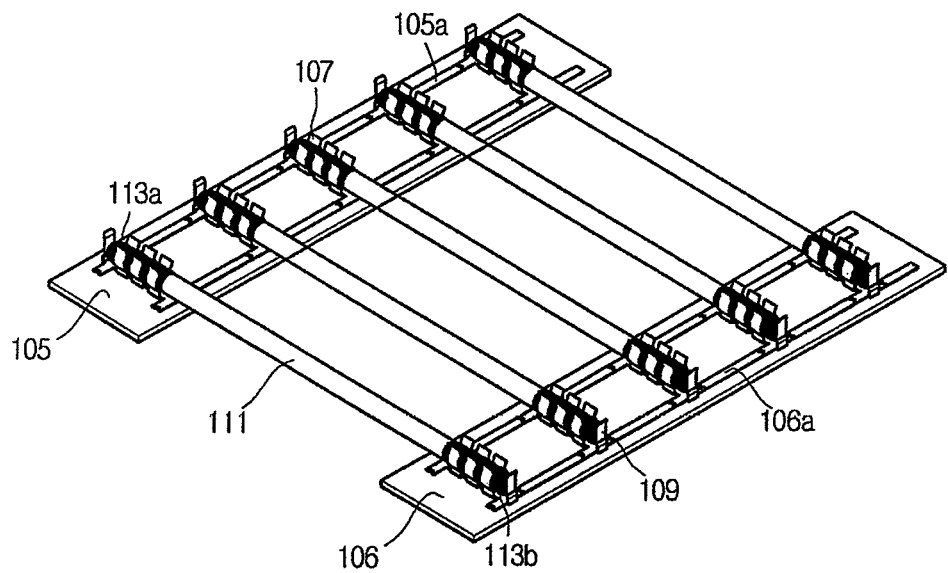
FIG. 3 is a perspective view showing some of a backlight unit of FIGS. 1 and 2.

As shown in FIG. 3, a first common electrode 105a is arranged on the first printed circuit board 105 in a longitudinal direction of the first printed circuit board 105. And, a second common electrode 106a is arranged on the second printed circuit board 106 in a longitudinal direction of the second printed circuit board 106. The first and second printed circuit boards 105, 106 may be fastened to the bottom cover 101. Each of the first and second common electrodes 105a, 106a may be arranged in a trapezoidal shape. In the respective first and second common electrodes 105a, 106a, first and second connecting holes (not shown) may be formed in order to electrically connect the first and second common electrodes 105a, 106a to a first terminal 123a which is connected to a first wire 123 of a first inverter 119 and a second terminal 125a which is connected to a second wire 125 of a second inverter 121 via a screw. The first and second common electrodes 105a, 106a may be embedded into the first and second printed circuit boards 105, 106 as a conductive pattern, or they may be formed by depositing and patterning a metal material to the first and second printed circuit boards 105, 106.

The plurality of first holders 107 are arranged in a longitudinal direction of the first printed circuit board 105, and they are electrically connected to the first common electrode 105a, respectively. Each of the plurality of first holders 107 is electrically connected to the first common electrode 105a by using a solder or a screw. The plurality of second holders 109 are arranged in a longitudinal direction of the second printed circuit board 106, and they are electrically connected to the second common electrode 106a, respectively. Each of the plurality of second holders 109 is electrically connected to the second common electrode 106a by using a solder or a screw.

The first and second holders 107, 109 may be formed of a conductive metal material having an elastic force so that first and second electrodes 113a, 113b of the lamp 111 are fixedly inserted and electrically connected thereto.

Figure 4A:
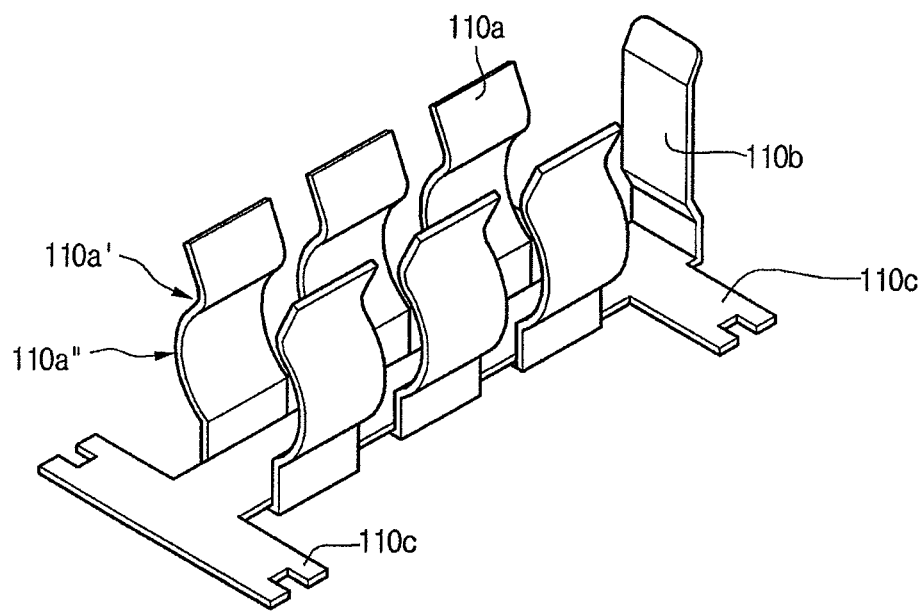
FIG. 4A is a perspective view showing a holder of FIG. 3.
Figure 4B:
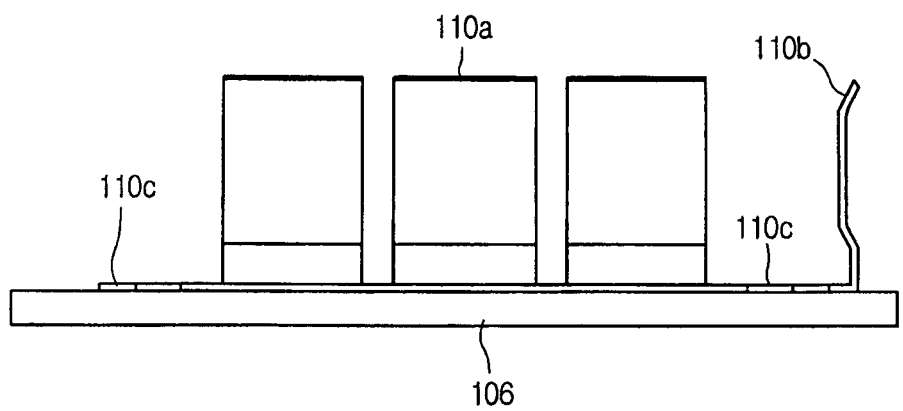
FIG. 4B is a cross-sectional view showing a holder of FIG. 3.

As shown in FIGS. 4a and 4b, each of the first and second holders 107, 109 includes first and second support 110a, 110b and a pedestal 110c so that the first and second electrodes 113a, 113b of the lamp 111 is attached or detached thereto. The first and second support 110a, 110b and the pedestal 110c may be integrally formed.

The first support 110a includes an elastic portion 110a' which has a specific curvature to surround both sides of the first and second electrodes 113a, 113b, and a sliding portion 110a" which is inclined from an end of the elastic portion 110a' at a specific angle and slides the first and second electrodes 113a, 113b toward the elastic portion 110a'. The second support 110b has a specific curvature to support one end of the first and second electrodes 113a, 113b and is arranged to face one side of the support 110a. The pedestal 110c is connected to the first common electrode 105a provided in the first printed circuit board 105 or the second common electrode 106a provided in the second printed circuit board 106 by using a solder or a screw. Otherwise, the pedestal 110c is mounted on the first common electrode 105a provided in the first printed circuit board 105 or the second common electrode 106a provided in the second printed circuit board 106 by using a surface mount technology. For example, a metallic adhesive material is formed in some portion of the first and second common electrode 105a, 106a, and the pedestal 110c of the first and second holders 107, 109 is attached, and thus, it may be fixed therein. Also, the pedestal 110c of the first and second holders 107, 109 is attached onto the first and second common electrodes 105a, 106a, and then the pedestal 110c may be further fixed by using the metallic adhesive material.

The lamp 111 is provided with first and second electrodes 113a, 113b which are exposed to the outside. The respective lamp 111 may be an external electrode fluorescent lamp. The respective lamp 111 may be arranged in the same plane. The respective lamp 111 may be formed in one direction so long.

According to the plurality of lamps 111, between the first and second printed circuit boards 105, 106, the first electrode 113a is electrically connected to the first holder 107 and the second electrode 113b is electrically connected to the second holder 109. The respective lamp 111 is inserted and fixed into the first and second holders 107, 109. The plurality of lamps 111 are arranged in the same plane to obtain an uniform luminance.

The first side frame 115 is positioned in the first region 101e of the bottom cover 101 and fastened to the bottom cover 101 by using a screw. The first side frame 115 is arranged to surround the first electrode 113a of the respective lamp 111 and prevents the first electrode 113a of the respective lamp 111 from being exposed to the outside. The first side frame 115 includes a reflective surface 116, which reflects light emitted from the respective lamp 111 as it is coated by a reflective material, and a through hole 118, through which the respective lamp 111 is passed as it is formed in the reflective surface 116. Therefore, the respective lamp 111 is inserted into the first side frame 115 through the through hole 118 of the first side frame 115, and it is inserted and fixed in the respective first holder 107.

The second side frame 117 is positioned in the second region 101f of the bottom cover 101 and fastened to the bottom cover 101 by using a screw. The second side frame 117 is arranged to surround the second electrode 113b of the respective lamp 111 and prevents the second electrode 113b of the respective lamp 111 from being exposed to the outside. The second side frame 117 includes a reflective surface 116, which reflects light emitted from the respective lamp 111 as it is coated by a reflective material, and a through hole 118, through which the respective lamp 111 is passed as it is formed in the reflective surface 116. Therefore, the respective lamp 111 is inserted into the second side frame 117 through the through hole 118 of the first side frame 115, and it is inserted and fixed in the respective second holder 109.

The optical sheet 137 is disposed on the plurality of lamps 111. The optical sheet 137 controls light emitted from the respective lamp 111 to obtain an uniform luminance. The optical sheet 137 includes a diffusion sheet 131, a first prism sheet 133 and a second prism sheet 135. The optical sheet 137 is seated on the seating surface 101c of the bottom cover 101 or the seating surface of the first and second side frames 115, 117. The optical sheet 137 is fixed by the panel guide 150. The diffusion sheet 131 diffuses light emitted from the respective lamp 111. The first and second prism sheets 133, 135 collects light emerged from the diffusion sheet 131. Therefore, light emitted from the respective lamp 111 is uniformly irradiated onto the entire region of the liquid crystal panel 166 by the optical sheet 137.

The first inverter 119 generating the first driving voltage is arranged in the first region 101e of the rear surface of the bottom cover 101, and the second inverter 121 generating the second driving voltage is arranged in the second region 101f of the rear surface of the bottom cover 101. The first inverter 119 includes a first wire 123 having a first terminal 123a which is to be electrically connected to the first common electrode 105a disposed in the first printed circuit board 105. The second inverter 121 includes a second wire 125 having a second terminal 125a which is to be electrically connected to the second common electrode 106a disposed in the second printed circuit board 106.

The first driving voltage generated in the first inverter 119 is supplied to the plurality of lamps 111 connected to the respective first holder 107 by passing through the first wire 123, the first common electrode 105a of the first printed circuit board 105 connected to the first wire 123 and the plurality of first holders 107 connected to the first common electrode 105a.

The second driving voltage generated from the second inverter 121 is supplied to the plurality of lamps 111 connected to the respective second holder 109 by passing through the second wire 125, the second common electrode 106a of the second printed circuit board 106 connected to the second wire 125 and the plurality of second holders 109 connected to the second common electrode 106a.

Thus, the respective lamp 111 is emitted by the first and second driving voltage, and the emitted light is controlled by the optical sheet 137 and irradiated onto the entire region of the liquid crystal panel 166. The liquid crystal panel 166 displays images using light irradiated from the backlight unit 100.

Therefore, according to the present disclosure, the common electrode is formed in the printed circuit board and the holder is connected to the common electrode by using the SMT process, and thus, the assembly process of the backlight unit may be simplified.

Also, according to the present disclosure, the manufacturing cost may be reduced and the thickness of the backlight unit may be decreased, since the conventional lower side frame is no longer required.

Also, according to the present disclosure, the noise due to the high voltage driving, which is generated by arranging a separate common electrode, may be prevented, since the conductive pattern is used as a common electrode.

Figure 5:
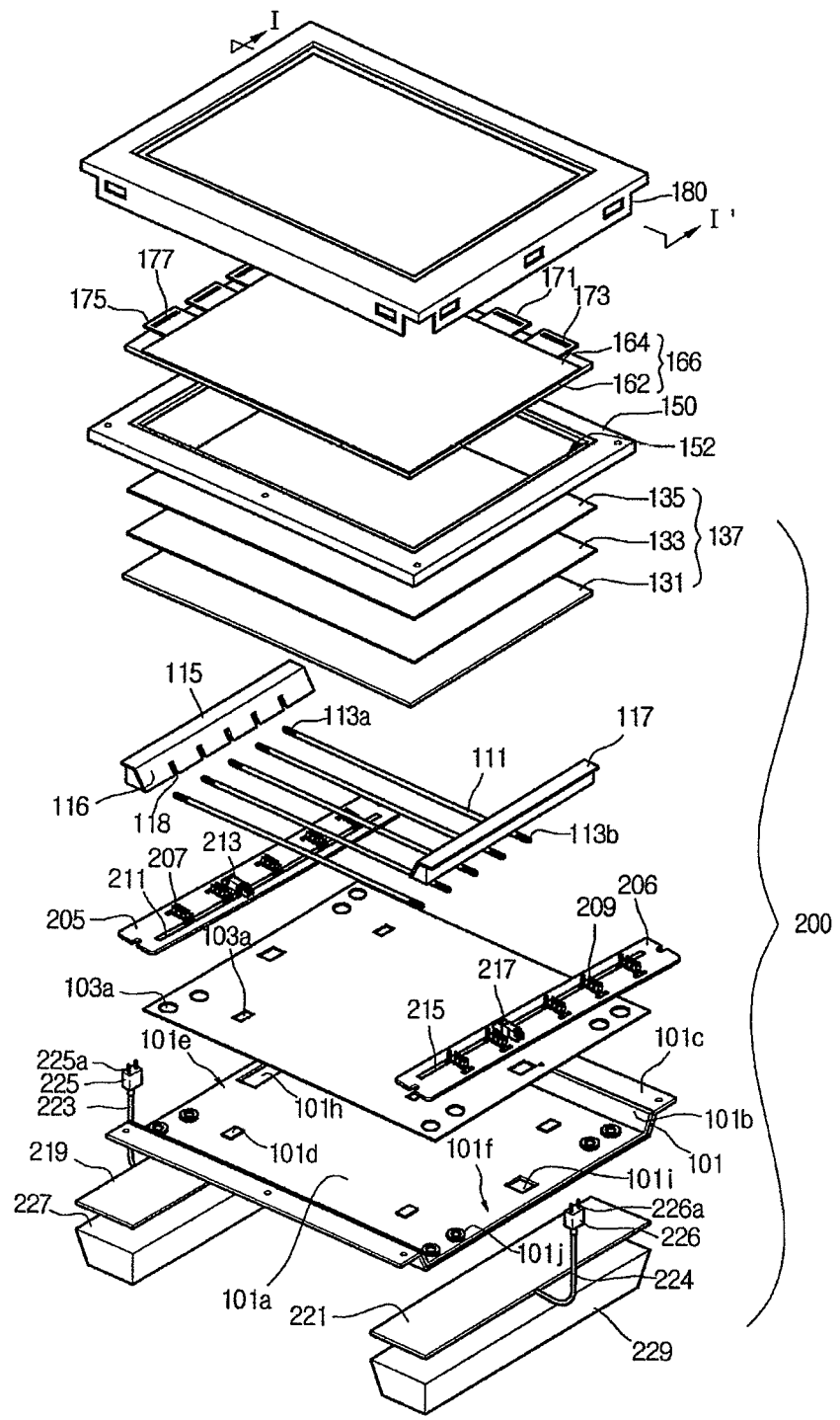
FIG. 5 is an exploded perspective view schematically showing a liquid crystal display device according to a second embodiment of the present disclosure.

FIG. 5 schematically shows a liquid crystal display device according to a second embodiment of the present disclosure in an exploded perspective view.

Referring to FIG. 5, the liquid crystal display device includes a backlight unit 200, a panel guide 150, a liquid crystal panel 166 and a case 180. The explanation for the panel guide 150, the liquid crystal panel 166 and the case 180 will be abbreviated, since they are the same constituents as the first embodiment.

The backlight unit 200 includes a bottom cover 101, a reflective sheet 103, first and second printed circuit boards 205 and 206, a plurality of first and second holders 207 and 209, a plurality of lamps 111, first and second side frames 115 and 117, an optical sheet 137, first and second inverters 219 and 221, and first and second protective covers 227 and 229.

The explanation for the reflective sheet 103, the lamps 111, the first and second side frames 115 and 117, and the optical sheet 137 will be abbreviated, since they are the same constituents as the first embodiment.

The bottom cover 101 includes a bottom surface 101a, a slanted surface 101b which is extended from the bottom surface 101a and inclined at a specific angle, and a seating surface 101c which is extended from the slanted surface 101b. The slanted surface 101b is formed in both sides of the bottom surface 101a. The seating surface 101c has a predetermined height from the bottom surface 101a, and it is formed in both sides of the slanted surface 101b. The respective slanted surface 101b is formed to face to each other.

In the bottom surface 101a of the bottom cover 101, projection regions 101d which are upwardly protruded in 4 regions are formed. The reflective sheet 103 is inserted in the respective projection regions 101d, thereby preventing the flow of the reflective sheet 103.

Figure 6:
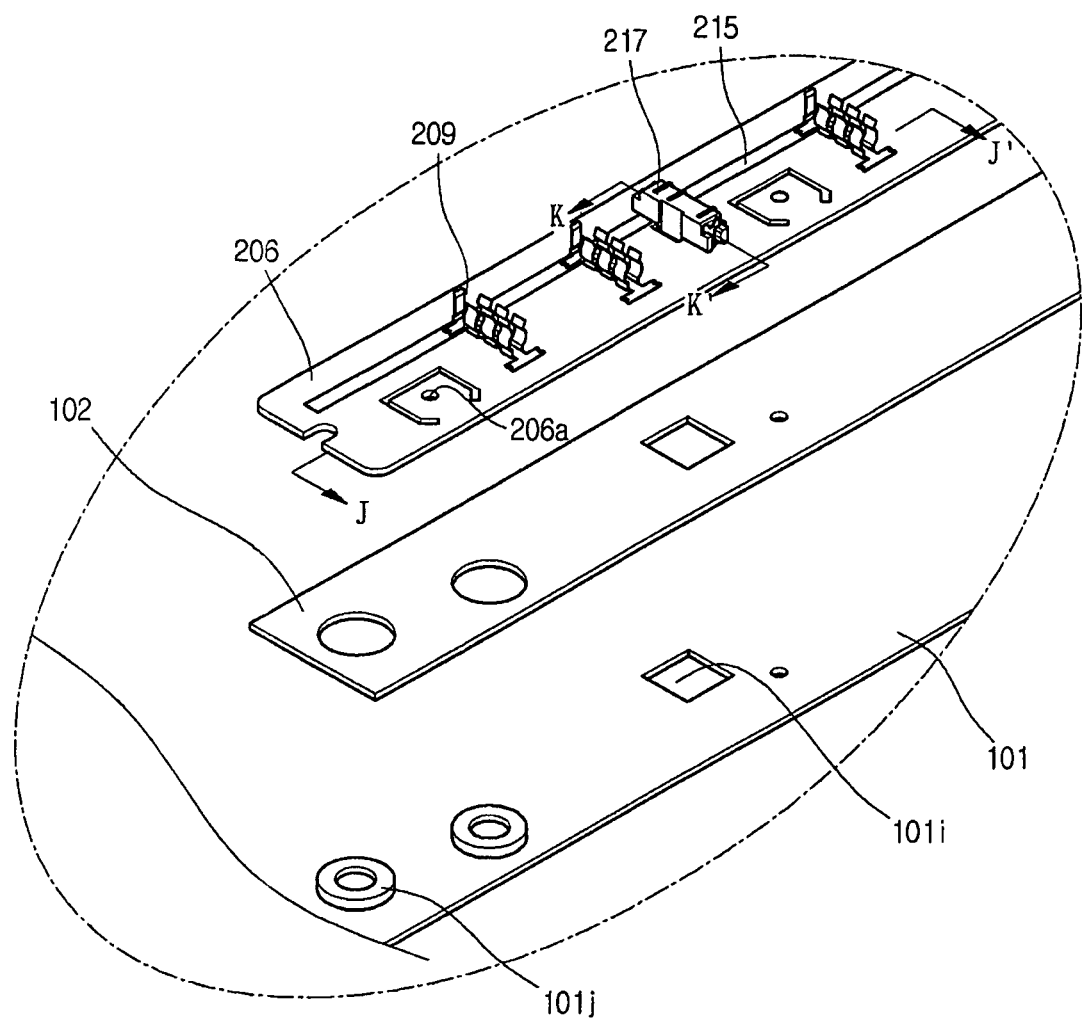
FIG. 6 is a perspective view showing a printed circuit board of FIG. 5.

As shown in FIG. 6, projection regions 101j, which are upwardly protruded, are formed in the first and second regions 101e, 101f of the bottom surface 101a of the bottom cover 101. The first and second printed circuit boards 205 and 206 are seated on the respective projection region 101j, and the first and second printed circuit boards 205 and 206 are fastened to the respective projection region 101j by using a screw.

Also, through holes 101i, which is to extrude the first and second connectors 213, 217 disposed in the first and second printed circuit boards 205 and 206 to be protruded to the outside of the bottom cover 101, is formed in the first and second regions 101e, 101f of the bottom surface 101a of the bottom cover 101. Therefore, the first and second connectors 213, 217 disposed in the first and second printed circuit boards 205 and 206 may be positioned to protrude out of the bottom cover 101 through the through holes 101i formed in the first and second regions 101e, 101f of the bottom surface 101a of the bottom cover 101.

An insulator 102 may be disposed between each of the first and second printed circuit boards 205 and 206 and the bottom cover 101 to insulate each of the first and second printed boards 205 and 206 and the bottom cover 101 and absorb the noise of the first and second printed circuit boards 205 and 206.

The first printed circuit board 205 is fastened to the first region 101e of the bottom cover 101, and the second printed circuit board 206 is fastened to the second region 101f of the bottom cover 101. The first and second regions 101e, 101f are disposed in the bottom surface 101a where the seating surface 101c of the bottom cover 101 is not present. The first and second regions 101e, 101f may be disposed in both edge regions of the bottom surface 101a.

Hereinafter, the second printed circuit board 206 will be explained, since the first printed circuit board 205 has the same structure as the second printed circuit board 206.

Figure 7A:
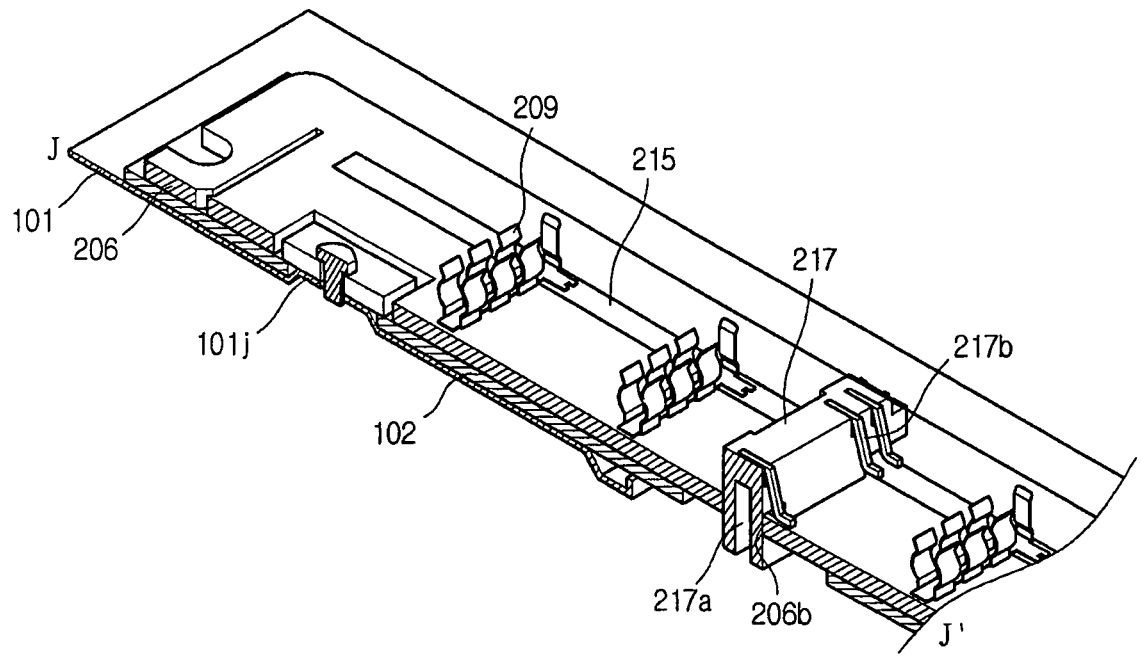
FIG. 7A is a cross-sectional view taken along the line J-J' of FIG. 6.
Figure 7B:
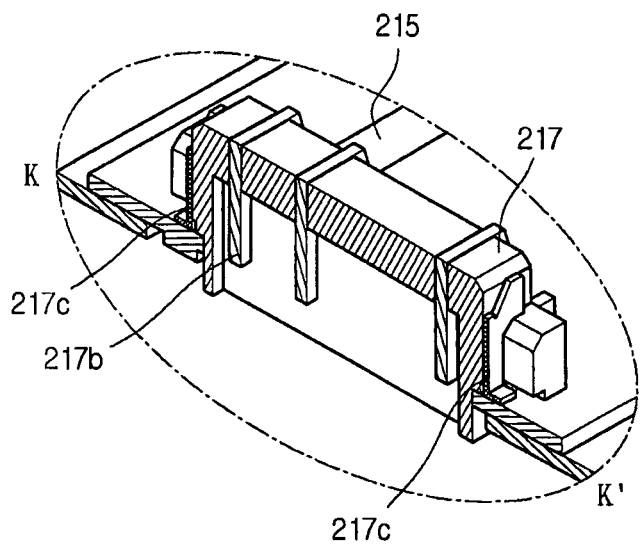
FIG. 7B is a cross-sectional view taken along the line K-K' of FIG. 6.
Figure 8A:
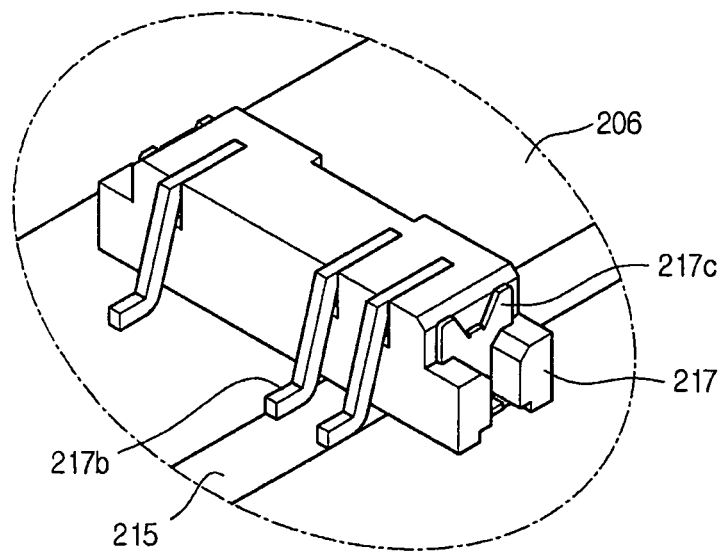
FIGS. 8A and 8B are perspective views showing a connector of FIG. 6.
Figure 8B:
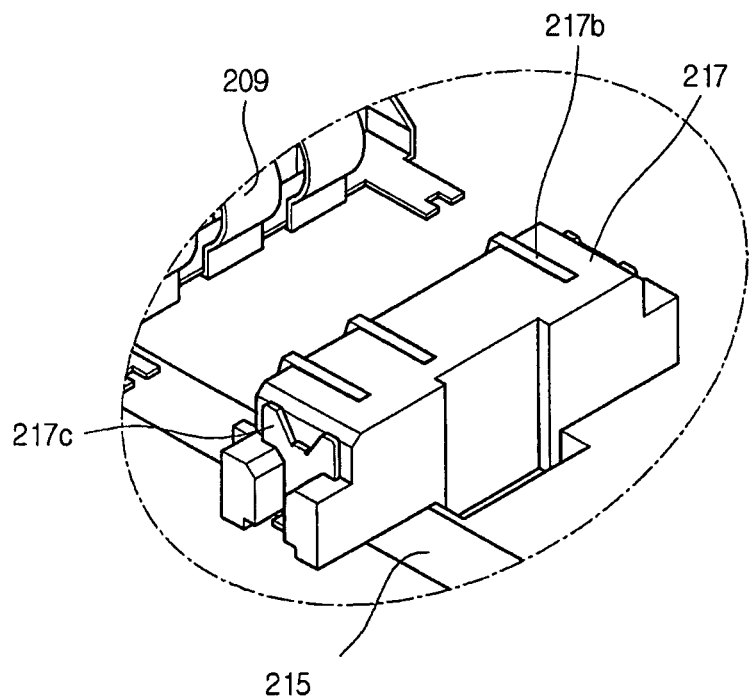

As shown in FIGS. 6, 7A and 7B, the second conductive pattern 215 is arranged in the second printed circuit board 206 in a longitudinal direction of the second printed circuit board 206. Also, the first conductive pattern 211 may be arranged in the first printed circuit board 205. The second conductive pattern 215 may be formed in one direction so long. Also, first through holes 206a which is to fasten the second printed circuit board 206 to the bottom cover using a screw, and second through holes 206b which is to extrude the second connector 217 out of the bottom cover 101 are formed in the second printed circuit board 206. Also, the first and second through holes 206a and 206b may be formed in the first printed circuit board 205.

As shown in FIGS. 7A, 7B, 8A and 8B, the second connector 217 includes a connecting recess 217a which is hollow in the inside, a connecting pin 217b of which one side is electrically connected to the second conductive pattern 215 and the other side is formed in the connecting recess 217a inside of the second connector 217, and a fixing mount 217c which is inserted in the second printed circuit board 206 to prevent the second connector 217 from flowing. The second connector 217 is securely fixed in the second printed circuit board 206 by the fixing mount 217c. One side of the connecting pin 217b is electrically connected to the second conductive pattern 215 and the other side is electrically connected to an exterior connector (to be described) which is inserted through the connecting recess 217a. The first printed circuit board 205 has the same constituents as the above-described second printed circuit board 206. The first and second connector 213, 217 may be a female-type connector.

The plurality of first holders 207 are arranged and electrically connected to the first conductive pattern 211 of the first printed circuit board 205, respectively. The respective first holder 207 is electrically connected to the first conductive pattern 211 by using a solder or a screw. The plurality of second holders 209 are arranged on the second printed circuit board 206 in a longitudinal direction and electrically connected to the second conductive pattern 215 of the second printed circuit board 206, respectively. The respective second holder 209 is electrically connected to the second conductive pattern 215 by using a solder or a screw.

The first and second holders 207, 209 may be formed of a conductive metal material having an elastic force so that the first and second electrodes 113a, 113b of the lamp 111 are fixedly inserted and electrically connected thereto. The first and second holders 207, 209 may be electrically connected to the first and second conductive patterns 211, 215 of the first and second printed circuit boards 205, 206 by using a solder or a screw.

The explanation for the first and second holders 207, 209 will be abbreviated, since the first and second holders 207, 209 have the same or similar structure as the first and second holders 107, 109 described in the first embodiment of the present invention.

A first inverter 219 generating the first driving voltage is arranged in the first region 101e of the rear of the bottom cover 101, and a second inverter 221 generating the second driving voltage is arranged in the second region 101f. The first inverter 219 includes a third connector 225 which is to be electrically connected to the first connector 213 disposed in the first printed circuit board 205, and a first wire 223 which is to electrically connect the first inverter 227 with the third connector 225. The second inverter 221 includes a fourth connector 226 which is to be electrically connected to the second connector 217 disposed in the second printed circuit board 206, and a second wire 224 which is to electrically connect the second inverter 221 with the fourth connector 226. The third and fourth connectors 225 and 226 may be a male-type connector. Each of The third and fourth connectors 225 and 226 includes projection pins 225a and 226a. Therefore, the projection pin 225a of the third connector 225 is electrically connected to the connecting pin of the first connector 213 disposed in the first printed circuit board 205, and the projection pin 226a of the four connector 226 is electrically connected to the connecting pin 217b of the second connector 217 disposed in the second printed circuit board 206.

The first driving voltage generated in the first inverter 219 is supplied to the plurality of lamps 111 connected to the respective first holder 207 by passing through the first wire 223, the third connector 225 connected to the first wire 223, the first connector 213 electrically connected to the third connector 225 and disposed in the first printed circuit board 205, the first conductive pattern 211 of the first printed circuit board 205 connected to the first connector 213, and the plurality of first holders 207 connected to the first conductive pattern 211.

The second driving voltage generated in the second inverter 221 is supplied to the plurality of lamps 111 connected to the respective second holder 209 by passing through the second wire 224, the fourth connector 226 connected to the second wire 224, the second connector 217 electrically connected to the fourth connector 226 and disposed in the second printed circuit board 206, the second conductive pattern 215 of the second printed circuit board 206 connected to the second connector 217, and the plurality of second holders 209 connected to the second conductive pattern 215.

Thus, the respective lamp 111 is emitted by the first and second driving voltage, and the emitted light is controlled by the optical sheet 137 and irradiated onto the entire region of the liquid crystal panel 166. The liquid crystal panel 166 displays images using light irradiated from the backlight unit 100.

Therefore, according to the present disclosure, the conductive pattern is formed in the printed circuit board and the holder is connected to the conductive pattern by using the SMT process, and thus, the assembly process of the backlight unit may be simplified.

Also, according to the present disclosure, the manufacturing cost may be reduced and the thickness of the backlight unit may be decreased, since the conventional lower side frame is no longer required.

Also, according to the present disclosure, the noise due to the high voltage driving, which is generated by arranging a separate common electrode, may be prevented, since the conductive pattern is formed in the printed circuit board and the holder is connected to the conductive pattern.

Also, according to the present disclosure, a bad connection due to a bad screw, which is generated as the inverter and the printed circuit board are connected by the conventional screw, may be prevented by directly connecting the inverter with the printed circuit board via the connector.

Moreover, according to the present disclosure, a management efficiency of the wire may be improved by minimizing the length of the wire, as the inverter and the printed circuit board are electrically connected by using the connector in a state that the bottom surface of the bottom cover is disposed therebetween.

Figure 9:
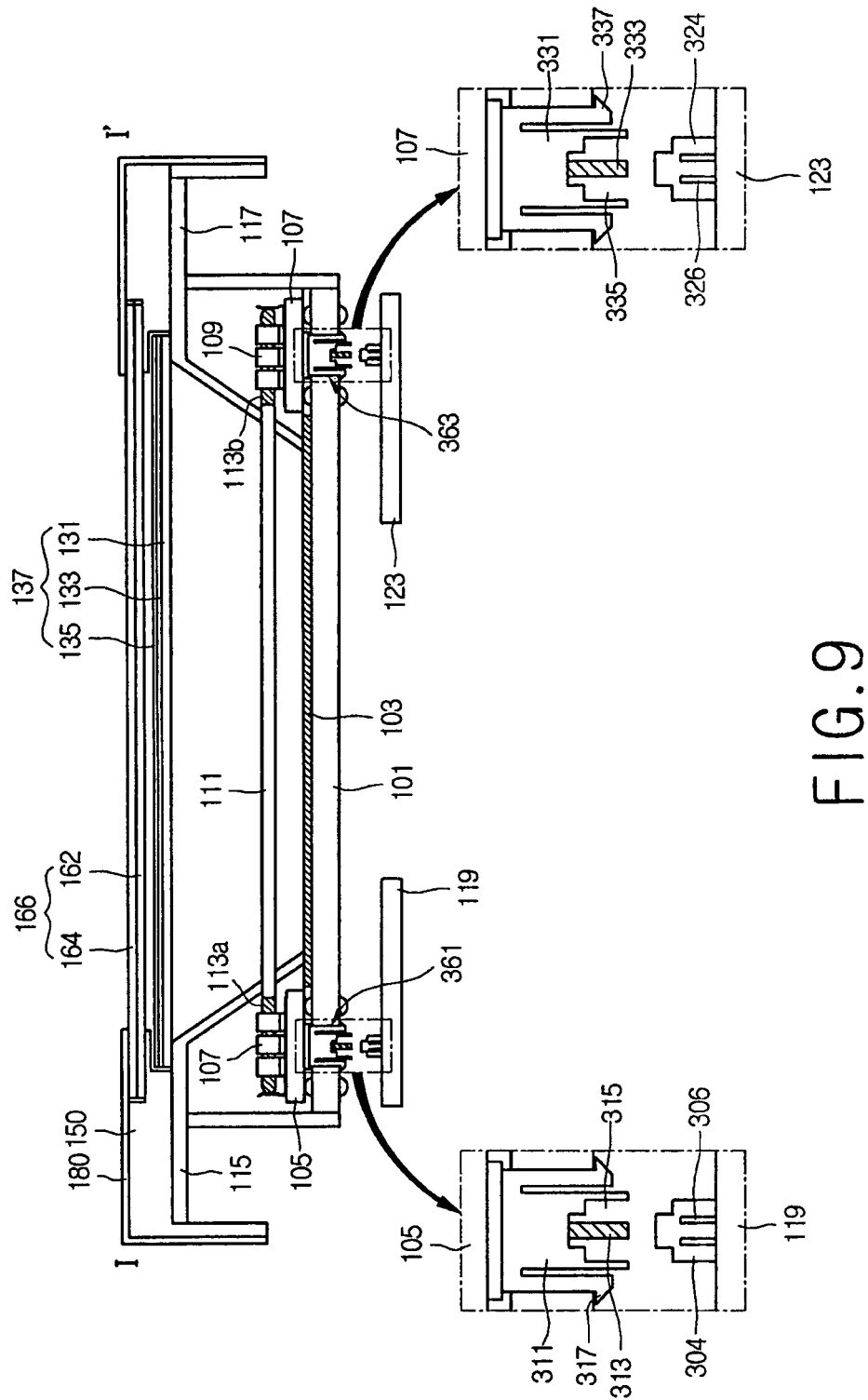
FIG. 9 is a cross-sectional view schematically showing a liquid crystal display device according to a third embodiment of the present disclosure.
Figure 10:
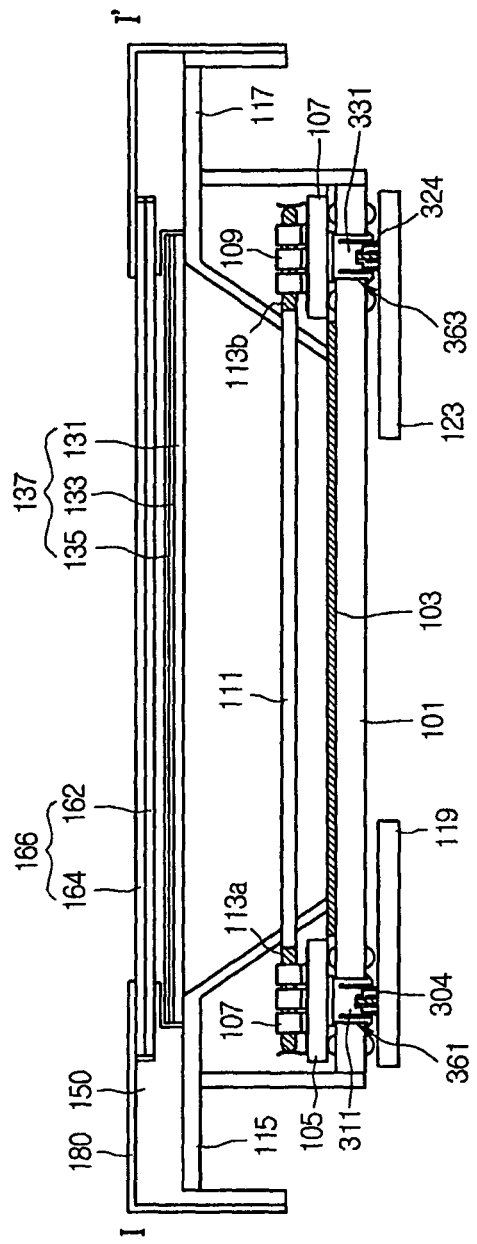
FIG. 10 is a view showing an inverter and a printed circuit board, which are assembled together.
Figure 11:
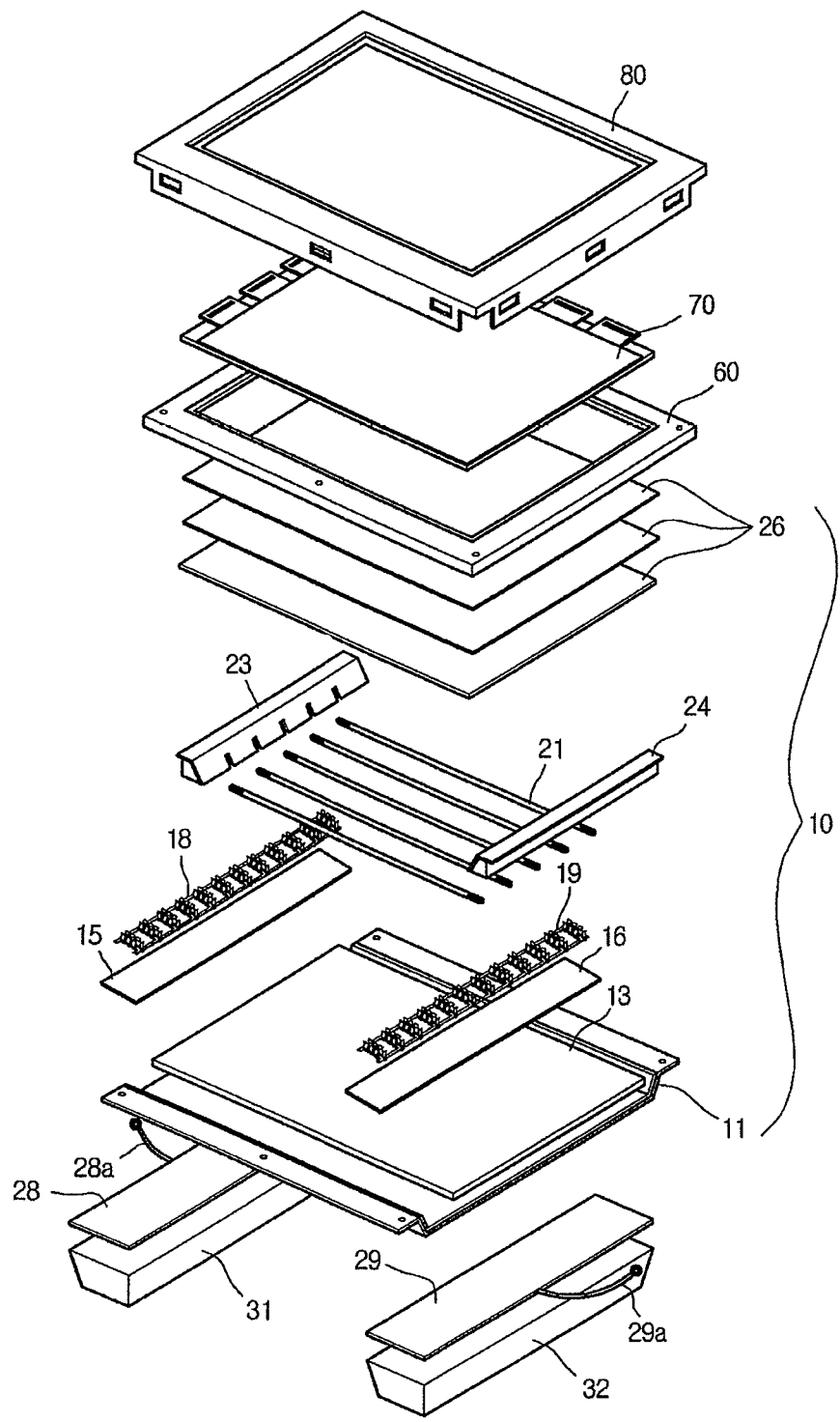
FIG. 11 is an exploded perspective view schematically showing a direct type liquid crystal display device in the related art.
Figure 12:
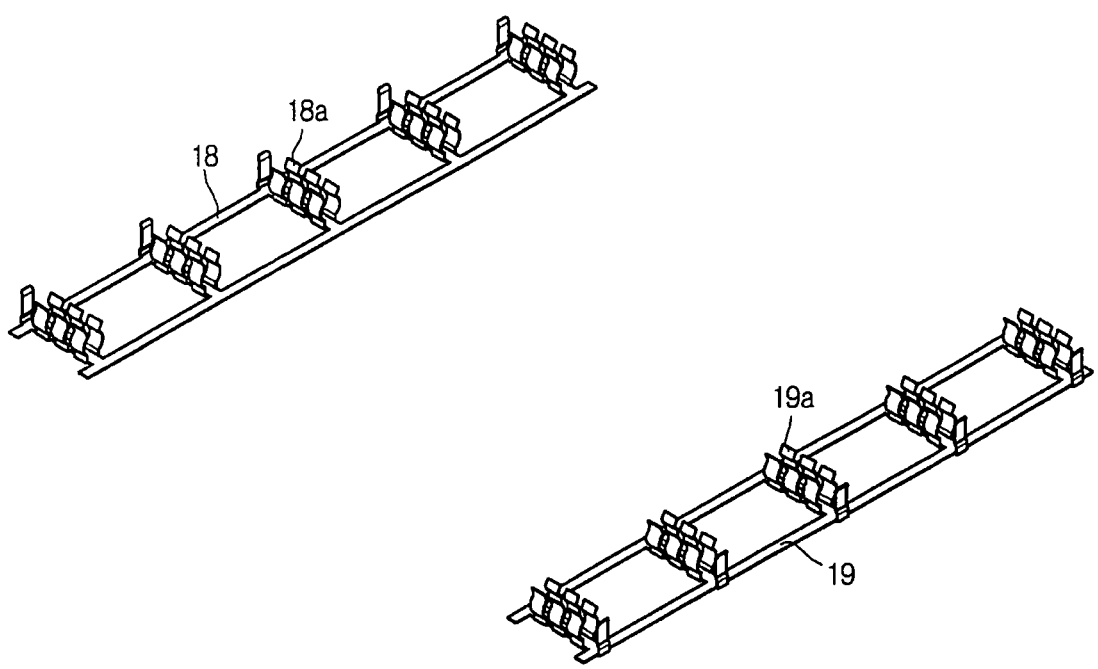
FIG. 12 is a perspective view showing common electrodes of FIG. 3.

FIGS. 9 and 10 schematically shows a liquid crystal display device using a backlight unit according to the third embodiment of the present disclosure, FIG. 9 shows an inverter and a printed circuit board in a cross-sectional view, which are not assembled, and FIG. 10 shows an inverter and a printed circuit board in a cross-sectional view, which are assembled together.

Referring to FIGS. 9 and 10, the detailed explanation will be abbreviated, since the liquid crystal display device has the same constituents as the first embodiment, except for the connection structure of the inverter and the printed circuit board of the backlight unit.

The backlight unit according to the first embodiment of the present invention is a wire-connection type which connects using a wire; however the backlight unit according to the third embodiment of the present invention is connects the inverter with the printed circuit board using a pin-connection type which connects using a pin.

The first connector 311 is mounted in the rear surface of the first printed circuit board and arranged to be protruded out of the bottom cover 101 by passing a first through hole 361 of the bottom cover 101. The second connector 331 is mounted in the rear surface of the second printed circuit board 107 and arranged to be protruded out of the bottom cover 101 by passing a second through hole 363 the bottom cover 101. The third connector 304 is electrically connected to the first printed circuit board 105 to reduce the first driving voltage, and mounted on the top of the first inverter 119 to face the first connector 311. The fourth connector 324 is electrically connected to the second printed circuit board 107 to reduce the second driving voltage, and mounted on the top of the second inverter 123 to face the second connector 331.

The first and second through holes 361 and 363 may be formed in the bottom cover in order to pass the first and second connectors 311 and 331. Therefore, the first connector 311 is protruded out of the bottom cover 101 via the first through hole 361, and the second connector 331 is protruded out of the bottom cover 101 via the second through hole 363, after that they are electrically connected to the third and fourth connectors 304 and 324, respectively.

The first connector 311 is mounted on the rear of the first printed circuit board 105, and inserted and fixed in the first through hole 361 of the bottom cover 101. The first connector 311 is provided with a first insertion recess 315 in which the third connector 304 is inserted, a first pin 313 protruded from the first insertion recess 315 and electrically connected to the third pins 306 of the third connector 304, and a plurality of first hooks 317 for fixing the first printed circuit board 105 to the bottom cover 101.

The third connector 304 is inserted and fixed in the first insertion recess 315 of the first connector 311. The first pin 313 is protruded from the first insertion recess 315 and applies a lamp driving voltage supplied from the third pins 306 of the third connector 304 which is inserted and fixed in the first insertion recess 315 to the first printed circuit board 105.

The first hooks 317 are inserted into the bottom cover 101 via the first through hole 361 so that the first printed circuit board 105 is mounted on the bottom cover 101.

The second connector 331 is mounted on the rear of the second printed circuit board 107, and inserted and fixed in the second through hole 363 of the bottom cover 101. The second connector 331 is provided with a second insertion recess 335 in which the fourth connector 324 is inserted, a second pin 333 protruded from the second insertion recess 335 and electrically connected to the fourth pins 326 of the fourth connector 324, and a plurality of second hooks 337 for fixing the second printed circuit board 107 to the bottom cover 101.

The fourth connector 324 is inserted and fixed in the second insertion recess 335 of the second connector 331. The second pin 333 is protruded from the second insertion recess 335 and applies a lamp driving voltage supplied from the fourth pins 326 of the fourth connector 324 which is inserted and fixed in the second insertion recess 335 to the second printed circuit board 107.

The second hooks 337 are inserted into the bottom cover 101 via the second through hole 363 so that the second printed circuit board 107 is mounted on the bottom cover 101.

The third connector 304 is mounted on the top of the first inverter 119 opposing to the bottom cover 101. The third connector 304 is provided with a plurality of third pins 306 for outputting the first driving voltage to the first connector 311. The third connector 304 applies the first driving voltage supplied from the first inverter 119 to the third pins 306 to the first connector 311.

The fourth connector 324 is mounted on the top of the second inverter 123 opposing to the bottom cover 101. The fourth connector 324 is provided with a plurality of fourth pins 326 for outputting the second driving voltage to the second connector 331. The fourth connector 324 applies the second driving voltage supplied from the second inverter 123 to the fourth pins 326 to the second connector 331.

According to the present invention, the connection structure of the inverter and the printed circuit board may be simplified by directly connecting the inverter with the printed circuit board via the connector having the pin, and the leakage current may be minimized by minimizing the transfer length of the driving voltage between the inverter and the printed circuit board.

As described in the above, according to the present disclosure, the conductive pattern is formed in the printed circuit board and the holder is connected to the conductive pattern by using the SMT process, and thus, the assembly process of the backlight unit may be simplified.

Also, according to the present disclosure, the manufacturing cost may be reduced and the thickness of the backlight unit may be decreased, since the conventional lower side frame is no longer required.

Also, according to the present disclosure, the noise due to the high voltage driving, which is generated by arranging a separate common electrode, may be prevented, since the conductive pattern is formed in the printed circuit board and the holder is connected to the conductive pattern.

Also, according to the present disclosure, a bad connection due to a bad screw, which is generated as the inverter and the printed circuit board are connected by the conventional screw, may be prevented by directly connecting the inverter with the printed circuit board via the connector.

Also, according to the present disclosure, a management efficiency of the wire may be improved by minimizing the length of the wire, as the inverter and the printed circuit board are electrically connected by using the connector in a state that the bottom surface of the bottom cover is disposed therebetween.

Moreover, according to the present disclosure, the leakage current may be reduced by minimizing the transfer length of the driving voltage, since the inverter and the printed circuit board are electrically connected by the connector.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit, comprising:
   a bottom cover;
   a first printed circuit board provided in a first upper surface of the bottom cover and having a first common electrode;
   a second printed circuit board provided in a second upper surface of the bottom cover and having a second common electrode;
   a plurality of first holders mounted on the first printed circuit board and electrically connected to the first common electrode;
   a plurality of second holders mounted on the second printed circuit board and electrically connected to the second common electrode;
   a plurality of lamps of which both ends are fixed in the first and second holders, respectively,
   an insulator disposed between each of the first and second printed circuit boards and the bottom cover,
   a first inverter provided in a first lower surface of the bottom cover,
   a second inverter provided in a second lower surface of the bottom cover,
   a first and second connectors each connected to the first and second common electrodes, and
   a third and fourth connectors each connected to the first and second inverters,
   wherein each of the first and second holders includes a plurality of first supports which has a curvature to surround both sides of the lamps, a second supports which has a curvature to support one end of the lamps and a plurality of pedestals which is connected to the first and second common electrodes,
   wherein each of the first and second common electrode includes a first pattern and a second pattern,
   the first pattern is separated from the second pattern by a first fixed interval,
   wherein the first and second connectors are mounted in rear surfaces of the first and second printed circuit boards, respectively, and arranged to be protruded out of the bottom cover by passing a first through hole and a second through hole of the bottom cover, respectively,
   wherein the third and fourth connectors are electrically connected to the first and second printed circuit boards, respectively, and mounted on a top of the first inverter and a top of the second inverter, respectively.

2. The backlight unit according to claim 1, further comprising a first wire and a second wire, the first wire being electrically connected to the first printed circuit board, and the second wire being electrically connected to the second printed circuit board.

3. The backlight unit according to claim 1, wherein the third and fourth connectors each are connected to the first and second connectors via the first and second through holes.

4. The backlight according to claim 1, wherein the first and second connectors are each connected to the first and second common electrode and the third and fourth connectors are each connected to the first and second inverters.

5. The backlight unit according to claim 4, wherein the third and fourth connectors each are connected to the first and second connectors via the first and second through holes.

6. The backlight unit according to claim 1 or claim 4, wherein the first and second connectors are protruded from the bottom cover via the first and second through holes, respectively.

7. The backlight unit according to claim 1, wherein each of the first and second printed circuit boards is fastened to the bottom cover.

8. The backlight unit according to claim 1, wherein the first connector is provided with a first insertion recess in which the third connector is inserted, a first pin protruded from the first insertion recess and electrically connected to the third pins of the third connector, and a plurality of first hooks for fixing the first printed circuit board to the bottom cover.

9. The backlight unit according to claim 1, wherein the second connector is provided with a second insertion recess in which the fourth connector is inserted, a second pin protruded from the second insertion recess and electrically connected to the fourth pins of the fourth connector, and a plurality of second hooks for fixing the second printed circuit board to the bottom cover.

* * * * *

UNITED STATES PATENT AND TRADEMARK OFFICE
CERTIFICATE OF CORRECTION

| | |
|---|---|
| PATENT NO. | : 8,960,935 B2 |
| APPLICATION NO. | : 11/964432 |
| DATED | : February 24, 2015 |
| INVENTOR(S) | : Eun Seok Jang et al. |

It is certified that error appears in the above-identified patent and that said Letters Patent is hereby corrected as shown below:

In the Claims

In column 14, claim 1, line 57, before "the first pattern is" insert --wherein--.

Signed and Sealed this
Twenty-first Day of July, 2015

Michelle K. Lee
*Director of the United States Patent and Trademark Office*